(12) United States Patent
Hattori et al.

(10) Patent No.: US 11,214,312 B2
(45) Date of Patent: Jan. 4, 2022

(54) VEHICLE STRUCTURE

(71) Applicant: Toyota Jidosha Kabushiki Kaisha, Toyota (JP)

(72) Inventors: Ryo Hattori, Kariya (JP); Yuchi Yamanouchi, Toyota (JP); Masaki Shitara, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/909,481

(22) Filed: Jun. 23, 2020

(65) Prior Publication Data

US 2020/0406980 A1 Dec. 31, 2020

(30) Foreign Application Priority Data

Jun. 28, 2019 (JP) .............................. JP2019-121357

(51) Int. Cl.
*B62D 25/06* (2006.01)
*B62D 25/04* (2006.01)
*B62D 25/02* (2006.01)
*B62D 25/08* (2006.01)

(52) U.S. Cl.
CPC ............ *B62D 25/04* (2013.01); *B62D 25/025* (2013.01); *B62D 25/06* (2013.01); *B62D 25/08* (2013.01)

(58) Field of Classification Search
CPC ....................................... B62D 25/04
USPC .............. 296/193.06, 186.1, 203.01, 203.02, 296/203.03, 185.1
See application file for complete search history.

(56) References Cited

U.S. PATENT DOCUMENTS

| | | | | |
|---|---|---|---|---|
| 4,807,925 A | * | 2/1989 | Sakamoto ............ | B62D 23/005 296/193.06 |
| 6,485,089 B2 | * | 11/2002 | Hanyu .................. | B62D 21/15 29/897.2 |
| 10,538,271 B2 | * | 1/2020 | Tyan ...................... | B62D 21/00 |
| 2015/0151796 A1 | * | 6/2015 | Berger .................. | B62D 25/04 296/193.06 |

FOREIGN PATENT DOCUMENTS

JP 2013-112274 A 6/2013

* cited by examiner

*Primary Examiner* — Dennis H Pedder
(74) *Attorney, Agent, or Firm* — Dinsmore & Shohl LLP

(57) ABSTRACT

Either a front pillar, which is disposed on a front side of a vehicle and extends along a vertical direction, or a rear pillar, which is disposed on a rear side of the vehicle and extends along the vertical direction, includes a first frame, and a second frame which is disposed rearward of the first frame, and top portions of the first frame and the second frame extend along a longitudinal direction to constitute frames of a roof.

14 Claims, 2 Drawing Sheets

VEHICLE STRUCTURE

CROSS REFERENCE TO RELATED APPLICATION

This application claims priority to Japanese Patent Application No. 2019-121357 filed on Jun. 28, 2019, which is incorporated herein by reference in its entirety including the specification, claims, drawings, and abstract.

TECHNICAL FIELD

The present disclosure relates to a vehicle structure including a side portion structure in which frames of front pillars or rear pillars are duplexed.

BACKGROUND

A front window side portion structure is described in JP 2013-112274 A, in which a front pillar includes two pillar members arranged forward and rearward in relation to each other.

In the front pillar described JP 2013-112274 A, because the forward pillar member and the rearward pillar member are joined to the same roof side rail, there is a possibility that loads applied to the two, forward and rearward, pillar members will be concentrated on the roof side rail.

With this in view, it is an effect of the present disclosure to provide a vehicle structure in which a load transfer efficiency of a front pillar or a rear pillar can be improved.

SUMMARY

In an aspect of this disclosure, a vehicle structure includes a front pillar which is disposed on a front side of a vehicle and extends along a vertical direction and a rear pillar which is disposed on a rear side of the vehicle and extends along the vertical direction, in which either the front pillar or the rear pillar includes a first frame, and a second frame which is disposed rearward of the first frame, and top portions of the first frame and the second frame extend along a longitudinal direction to function as frames of a roof.

Because the top portions of the first frame and the second frame which are disposed forward and rearward in relation to each other as the frames of the front pillar or the rear pillar also constitute the frames of the roof, it becomes possible to provide a vehicle structure in which a load transfer efficiency of the front pillar or the rear pillar can be improved.

In an aspect of this disclosure, the vehicle structure may include a plurality of cross members configured to connect the first frame and the second frame.

According to the above configuration, a load can be transferred between the first frame and the second frame through the cross members with a high degree of efficiency.

In an aspect of this disclosure, the vehicle structure may further include a first transverse frame which is formed in an inverted U shape and has a first right side vertical frame extending upward from a right rocker panel, a first left side vertical frame extending upward from a left rocker panel, and a first connection member configured to connect an upper end of the first right side vertical frame and an upper end of the first left side vertical frame, in which at least one of the first frame and the second frame may be joined to the first transverse frame.

According to the above configuration, because at least one of the first frame and the second frame is joined to the first transverse frame, a load imposed on the first frame or the second frame can be dispersed efficiently.

In an aspect of this disclosure, the vehicle structure may further include a second transverse frame which is formed in an inverted U shape and has a second right side vertical frame extending upward from the right rocker panel, a second left side vertical frame extending upward from the left rocker panel, and a second connection member configured to connect an upper end of the second right side vertical frame and an upper end of the second left side vertical frame, and include a roof frame which extends along the longitudinal direction and is configured to connect the first transverse frame and the second transverse frame, in which a region of connection between the first frame and the first transverse frame or a region of connection between the second frame and the first transverse frame may be positioned on an extension of the roof frame.

According to the above configuration, further including the roof frame configured to connect the first and second transverse frames and positioning of the region of connection between the first or second frame and the first transverse frame on the extension of the roof frame can contribute to formation of a further efficient load transform path.

The present disclosure can provide a vehicle structure in which the load transfer efficiency of the front pillar or the rear pillar is improved.

BRIEF DESCRIPTION OF DRAWINGS

Embodiments of the present disclosure will be described based on the following figures, wherein.

DESCRIPTION OF EMBODIMENTS

Figure 1:
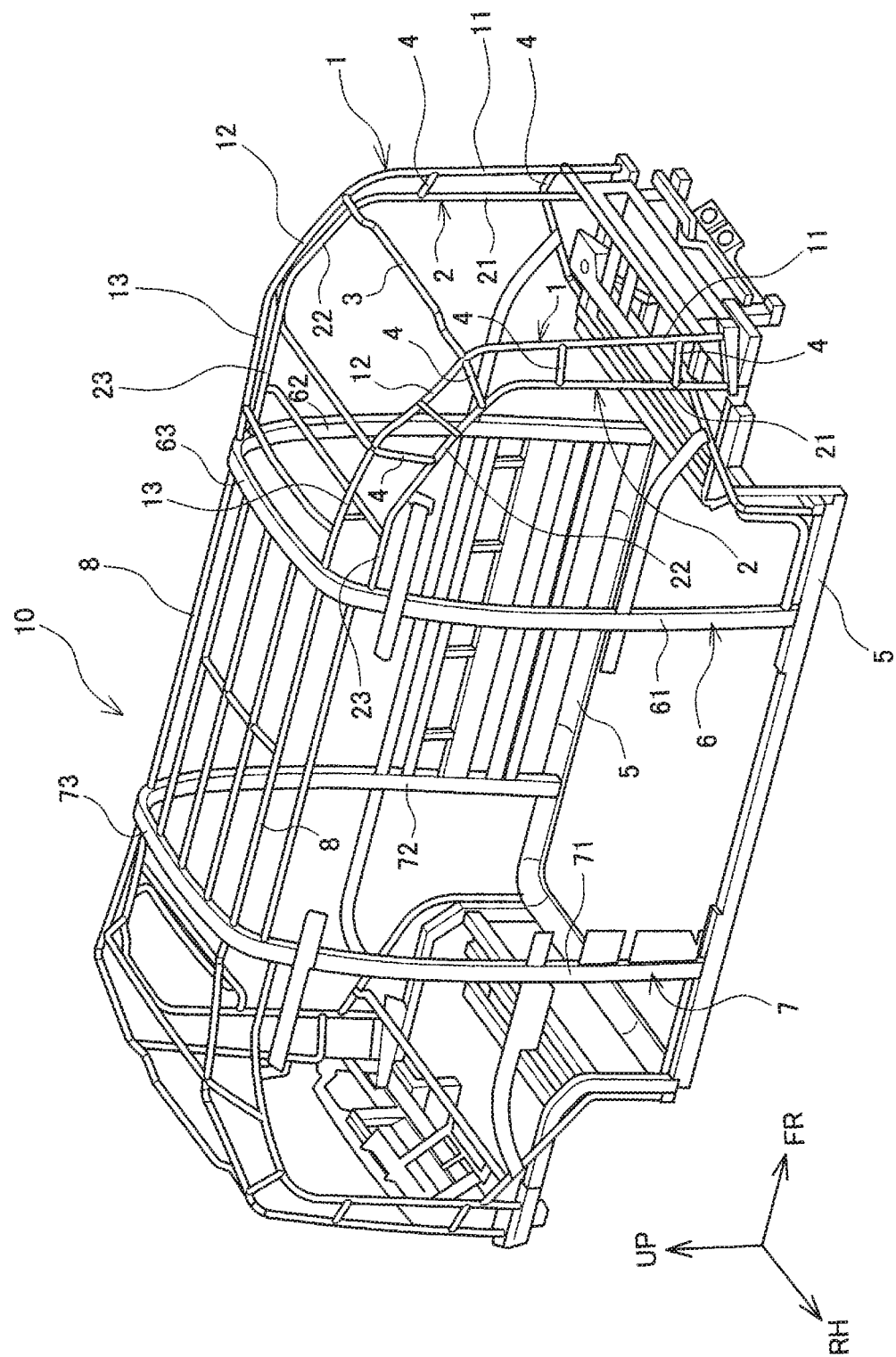
FIG. 1 is a perspective view showing a vehicle structure according to a first embodiment.

Hereinafter, embodiments of a vehicle structure according to this disclosure will be described with reference to the drawings. Arrows FR, UP, and RH shown in the drawings which will be referenced in the following explanation represent a forward direction (a travel direction), an upward direction, and a right hand direction of a vehicle, respectively. Further, directions opposite to those indicated by the arrows FR, UP, and RH represent a rearward direction, a downward direction, and a left hand direction of the vehicle, respectively. Hereinafter, unless otherwise specified, descriptions simply using terms of forward, rearward, right, left, upward, downward, and the like will denote forward or rearward in a vehicle longitudinal direction, right or left in a vehicle lateral direction (vehicle width direction), and upward or downward in a vehicle vertical direction.

Embodiment 1

As shown in FIG. 1, in a vehicle structure 10 according to a first embodiment, each of front pillars disposed on right and left sides of the vehicle structure 10 includes a first frame 1 and a second frame 2. The second frame 2 is positioned rearward of the first frame 1. The first frame 1 is composed of a bottom portion 11 extending along a vertical direction, a middle portion 12 extending upward from a top end of the bottom portion 11 along a slanting rearward direction, and a top portion 13 extending along a longitudinal direction. Similarly, the second frame 2 includes a bottom portion 21 extending along the vertical direction, a middle portion 22 extending upward from a top end of the bottom portion 21 along the slanting rearward direction, and a top portion 23 extending along the longitudinal direction.

In a vehicle having the vehicle structure 10, a division bar 3 extending along a vehicle width direction divides a wind shield into an upper wind shield and a lower wind shield. The lower wind shield is disposed between the bottom portions 11 of the first frames 1 in the right and left front pillars, and the upper wind shield is disposed between the middle portions 12 of the first frames 1 in the right and left front pillars. For this reason, the upper wind shield is inclined toward an upward and rearward region from the division bar 3.

In the vehicle having the vehicle structure 10, a front portion of a roof is provided to bridge the top portions 13 of the first frames 1 in the right and left front pillars along the vehicle width direction, and is further extended from the top portions 13 of the first frames 1 to the top portions 23 of the second frames 2 of the right and left front pillars in the vehicle width direction. For this reason, the top portions 13 of the first frames 1 and the top portions 23 of the second frames 2 in the right and left front pillars also function as frames of the roof. In each of the front pillars, because the first frame 1 and the second frame 2 are arranged one after the other in the longitudinal direction as the frames of each of the front pillars with the top portion 13 of the first frame 1 and the top portion 23 of the second frame 2 constituting the frames of the roof as described above, each of the front pillars can have a load transmission efficiency higher than that in a case where the first frame 1 and the second frame 2 arranged one after the other in the longitudinal direction are joined to one same roof side rail.

Each of the front pillars includes the first frame 1 and the second frame 2, and the second frame 2 is located rearward of the first frame 1 and outward thereof in the vehicle width direction. For this reason, panels of the front pillars are inclined (or curved) in the vehicle structure 10 as viewed from above, which can prevent four corners of the vehicle from being square in a plan view. In addition, because two thin frames are provided in place of a single thick frame, the front pillars can be minimized in thickness.

The vehicle structure 10 further includes a plurality of cross members 4 configured to connect the first frame 1 and the second frame 2. Because of this, a load can be efficiently transferred between the first frame 1 and the second frame 2 through the plurality of cross members 4.

The vehicle structure 10 further includes a rocker panel 5 extending from a front wheel housing to a rear wheel housing along the longitudinal direction on each of right and left sides of the vehicle structure 10. Further, the vehicle structure 10 includes a first transverse frame 6 which is formed in an inverted U shape and is connected to both the rocker panel 5 on the right side and the rocker panel 5 on the left side. The first transverse frame 6 is composed of a first right side vertical frame 61 extending upward from the rocker panel 5 on the right side, a first left side vertical frame 62 extending upward from the rocker panel 5 on the left side, and a first connection member 63 configured to connect an upper end of the first right side vertical frame 61 and an upper end of the first left side vertical frame 62. The first right side vertical frame 61, the first left side vertical frame 62, and the first connection member 63 of the first transverse frame 6 have closed cross sections which may be continuously joined to each other as shown in FIG. 1 or may be separated by a roof rail or other components. A rear end of the top portion 13 of the first frame 1 is connected to the first transverse frame 6, and a rear end of the top portion 23 of the second frame 2 is also connected to the first transverse frame 6. Because of such connection of the first transverse frame 6 to both first frame 1 and the second frame 2, loads applied to the first frame 1 and the second frame 2 can be dispersed with a high degree of efficiency.

The vehicle structure 10 further include a second transverse frame 7 which is formed in an inverted U shape and is joined to both the rocker panel 5 on the right side and the rocker panel 5 on the left side. As in the case of the first transverse frame 6, the second transverse frame 7 is composed of a second right side vertical frame 71 extending upward from the rocker panel 5 on the right side, a second left side vertical frame 72 extending upward from the rocker panel 5 on the left side, and a second connection member 73 configured to connect an upper end of the second right side vertical frame 71 and an upper end of the second left side vertical frame 72. The second right side vertical frame 71, the second left side vertical frame 72, and the second connection member 73 of the second transverse frame 7 have closed cross sections which may be continuously joined to each other as shown in FIG. 1, or may be separated by the roof rail or other components. Still further, the vehicle structure 10 includes, on each of right and left sides of the vehicle structure 10, a roof frame 8 which extends along the longitudinal direction and is configured to connect the first transverse frame 6 and the second transverse frame 7. A region of connection between the first frame 1 and the first transverse frame 6 is located on an extension of the roof frame 8. Because of the presence of the roof frame 8 configured to connect the first transverse frame 6 and the second transverse frame 7 and the positioning of the region of connection between the first frame 1 and the first traverse frame 6 on the extension of the roof frame 8 as described above, a load transfer path can be formed to further efficiently transfer the loads from the front pillar to a rear region.

Embodiment 2

Figure 2:
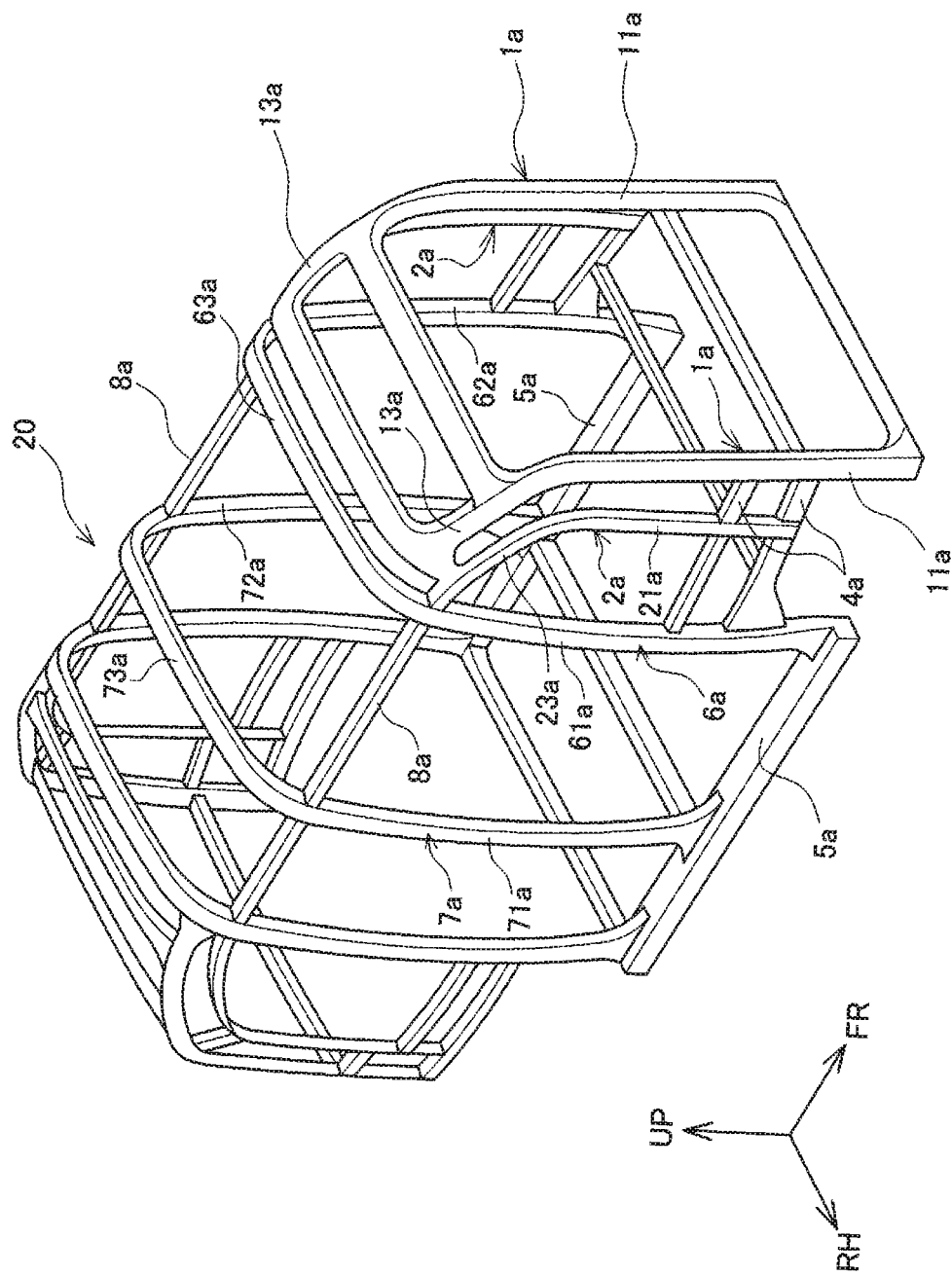
FIG. 2 is a perspective view showing a vehicle structure according to a second embodiment.

Next, a vehicle structure 20 according to a second embodiment will be described with reference to FIG. 2. As shown in FIG. 2, each of the front pillars on right and left sides of the vehicle structure 20 includes a first frame 1a and a second frame 2a. The second frame 2a is disposed rearward of the first frame 1a. The first frame 1a is composed of a bottom portion 11a extending along the vertical direction and a top portion 13a extending along the longitudinal direction. Similarly, the second frame 2a is composed of a bottom portion 21a extending along the vertical direction and a top portion 23a extending along the longitudinal direction. In a vehicle having the vehicle structure 20, the wind shield is disposed between the bottom portions 11a of the first frames 1a in the right and left front pillars.

In the vehicle having the vehicle structure 20, the front portion of the roof is provided to bridge the top portions 13a of the first frames 1a in the right and left front pillars along the vehicle width direction, and is further extended from the top portions 13a of the first frames 1a to the top portions 23a of the second frames 2a in the right and left front pillars. For this reason, the top portions 13a of the first frames 1a and the top portions 23a of the second frames 21 in the right and left front pillars also function as frames of the roof. In each of the front pillars, because the first frame 1a and the second frame 2a are arranged one after the other in the longitudinal direction as the frames of each of the front pillars with the top portion 13a of the first frame 1a and the top portion 23a of the second frame 2a constituting the frames of the roof as described above, the load transfer efficiency of the front pillars can be improved.

The vehicle structure 20 further includes a plurality of cross members 4a configured to connect the first frame 1a and the second frame 2a. Because of this, the load can be efficiently transferred between the first frame 1a and the second frame 2a through the plurality of cross members 4a.

The vehicle structure 20 further includes a rocker panel 5a extending from the front wheel housing to the rear wheel housing along the longitudinal direction on each of right and left sides of the vehicle structure 20. Further, the vehicle structure 20 includes a first transverse frame 6a which is formed in an inverted U shape and is connected to both the rocker panel 5a on the right side and the rocker panel 5a on the left side. The first transverse frame 6a is composed of a first right side vertical frame 61a extending upward from the rocker panel 5a on the right side, a first left side vertical frame 62a extending upward from the rocker panel 5a on the left side, and a first connection member 63a configured to connect an upper end of the first right side vertical frame 61a and an upper end of the first left side vertical frame 62a. A rear end of the top portion 23a of the second frame 2a is joined to the first transverse frame 6a. When the second frame 2a is joined to the first transverse frame 6a as described above, a load applied to the second frame 2a can be dispersed efficiently.

The vehicle structure 20 further include a second transverse frame 7a which is formed in an inverted U shape and is joined to both the rocker panel 5a on the right side and the rocker panel 5a on the left side. As in the case of the first transverse frame 6a, the second transverse frame 7a is composed of a second right side vertical frame 71a extending upward from the rocker panel 5a on the right side, a second left side vertical frame 72a extending upward from the rocker panel 5a on the left side, and a second connection member 73a configured to connect an upper end of the second right side vertical frame 71a and an upper end of the second left side vertical frame 72a. Still further, the vehicle structure 20 includes, on each of right and left sides of the vehicle structure 20, a roof frame 8a which extends along the longitudinal direction and is configured to connect the first transverse frame 6a and the second transverse frame 7a. A region of connection between the second frame 2a and the first transverse frame 6a is located on an extension of the roof frame 8a. Because of the presence of the roof frame 8a configured to connect the first transverse frame 6a and the second transverse frame 7a and the positioning of the region of connection between the second frame 2a and the first traverse frame 6a on the extension of the roof frame 8a, a load transfer path can be formed to further efficiently transfer a load from the front pillar to the rear region.

SUPPLEMENTAL INFORMATION OF EMBODIMENT

The vehicle structure of this disclosure is not limited to the above-described embodiments, and may be implemented in various forms without departing from the gist of this disclosure. For example, a rear pillar may include a first frame and a second frame disposed rearward of the first frame, and top portions of the first frame and the second frame may extend along the longitudinal direction so as to constitute frames of the roof.

The invention claimed is:

1. A vehicle structure comprising:
   a front pillar which is disposed on a front side of a vehicle and extends along a vertical direction; and
   a rear pillar which is disposed on a rear side of the vehicle and extends along the vertical direction, wherein
   the front pillar comprises a first frame and a second frame which is disposed rearward of the first frame, and
   top portions of the first frame and the second frame include curved portions, the top portions extend along a longitudinal direction to function as frames of a roof.

2. The vehicle structure according to claim 1, further comprising:
   a plurality of cross members which are configured to connect the first frame and the second frame.

3. The vehicle structure according to claim 1, further comprising:
   a first transverse frame which is formed in an inverted U shape and is composed of a first right side vertical frame extending upward from a right rocker panel, a first left side vertical frame extending upward from a left rocker panel, and a first connection member configured to connect an upper end of the first right side vertical frame and an upper end of the first left side vertical frame, wherein
   at least one of the first frame and the second frame is joined to the first transverse frame.

4. The vehicle structure according to claim 2, further comprising:
   a first transverse frame which is formed in an inverted U shape and is composed of a first right side vertical frame extending upward from a right rocker panel, a first left side vertical frame extending upward from a left rocker panel, and a first connection member configured to connect an upper end of the first right side vertical frame and an upper end of the first left side vertical frame, wherein
   at least one of the first frame and the second frame is joined to the first transverse frame.

5. The vehicle structure according to claim 3, further comprising:
   a second transverse frame which is formed in an inverted U shape and is composed of a second right side vertical frame extending upward from the right rocker panel, a second left side vertical frame extending upward from the left rocker panel, and a second connection member configured to connect an upper end of the second right side vertical frame and an upper end of the second left side vertical frame; and
   a roof frame which extends along the longitudinal direction and is configured to connect the first transverse frame and the second transverse frame, wherein
   a region of connection between the first frame and the first transverse frame or a region of connection between the second frame and the first transverse frame is located on an extension of the roof frame.

6. The vehicle structure according to claim 4, further comprising:
   a second transverse frame which is formed in an inverted U shape and is composed of a second right side vertical frame extending upward from the right rocker panel, a second left side vertical frame extending upward from the left rocker panel, and a second connection member configured to connect an upper end of the second right side vertical frame and an upper end of the second left side vertical frame; and
   a roof frame which extends along the longitudinal direction and is configured to connect the first transverse frame and the second transverse frame, wherein a region of connection between the first frame and the first transverse frame or a region of connection between the second frame and the first transverse frame is located on an extension of the roof frame.

7. A vehicle structure comprising:
a front pillar which is disposed on a front side of a vehicle and extends along a vertical direction; and
a rear pillar which is disposed on a rear side of the vehicle and extends along the vertical direction, wherein
the front pillar comprises a first frame and a second frame which is disposed rearward of the first frame,
the first frame and the second frame each comprise a bottom portion, a middle portion, and a top portion, a top end of the bottom portion is coupled to a bottom end of the middle portion, and a top end of the middle portion is coupled to one end of the top portion,
the bottom portions of the first frame and the second frame extend along a vertical direction,
the middle portions of the first frame and the second frame extend along a slanting rearward direction, and
the top portions of the first frame and the second frame extend along a longitudinal direction to function as frames of a roof.

8. The vehicle structure according to claim 7, further comprising:
a plurality of cross members which are configured to connect the first frame and the second frame.

9. The vehicle structure according to claim 7, further comprising:
a first transverse frame which is formed in an inverted U shape and is composed of a first right side vertical frame extending upward from a right rocker panel, a first left side vertical frame extending upward from a left rocker panel, and a first connection member configured to connect an upper end of the first right side vertical frame and an upper end of the first left side vertical frame, wherein
at least one of the first frame and the second frame is joined to the first transverse frame.

10. The vehicle structure according to claim 8, further comprising:
a first transverse frame which is formed in an inverted U shape and is composed of a first right side vertical frame extending upward from a right rocker panel, a first left side vertical frame extending upward from a left rocker panel, and a first connection member configured to connect an upper end of the first right side vertical frame and an upper end of the first left side vertical frame, wherein
at least one of the first frame and the second frame is joined to the first transverse frame.

11. The vehicle structure according to claim 9, further comprising:
a second transverse frame which is formed in an inverted U shape and is composed of a second right side vertical frame extending upward from the right rocker panel, a second left side vertical frame extending upward from the left rocker panel, and a second connection member configured to connect an upper end of the second right side vertical frame and an upper end of the second left side vertical frame; and
a roof frame which extends along the longitudinal direction and is configured to connect the first transverse frame and the second transverse frame, wherein
a region of connection between the first frame and the first transverse frame or a region of connection between the second frame and the first transverse frame is located on an extension of the roof frame.

12. The vehicle structure according to claim 10, further comprising:
a second transverse frame which is formed in an inverted U shape and is composed of a second right side vertical frame extending upward from the right rocker panel, a second left side vertical frame extending upward from the left rocker panel, and a second connection member configured to connect an upper end of the second right side vertical frame and an upper end of the second left side vertical frame; and
a roof frame which extends along the longitudinal direction and is configured to connect the first transverse frame and the second transverse frame, wherein
a region of connection between the first frame and the first transverse frame or a region of connection between the second frame and the first transverse frame is located on an extension of the roof frame.

13. A vehicle structure comprising:
a front pillar which is disposed on a front side of a vehicle and extends along a vertical direction;
a rear pillar which is disposed on a rear side of the vehicle and extends along the vertical direction;
a first transverse frame which is formed in an inverted U shape and is composed of a first right side vertical frame extending upward from a right rocker panel, a first left side vertical frame extending upward from a left rocker panel, and a first connection member configured to connect an upper end of the first right side vertical frame and an upper end of the first left side vertical frame;
a second transverse frame which is formed in an inverted U shape and is composed of a second right side vertical frame extending upward from the right rocker panel, a second left side vertical frame extending upward from the left rocker panel, and a second connection member configured to connect an upper end of the second right side vertical frame and an upper end of the second left side vertical frame; and
a roof frame which extends along the longitudinal direction and is configured to connect the first transverse frame and the second transverse frame, wherein
the front pillar comprises a first frame and a second frame which is disposed rearward of the first frame,
top portions of the first frame and the second frame extend along a longitudinal direction to function as frames of a roof,
the first frame and the second frame are joined to the first transverse frame, and
a region of connection between the first frame and the first connection member and a region of connection between the second frame and the first connection member is located on an extension of the roof frame.

14. The vehicle structure according to claim 13, further comprising:
a plurality of cross members which are configured to connect the first frame and the second frame.

* * * * *